United States Patent

Honjo

(10) Patent No.: US 10,769,800 B2
(45) Date of Patent: Sep. 8, 2020

(54) MOVING OBJECT DETECTION APPARATUS, CONTROL METHOD FOR MOVING OBJECT DETECTION APPARATUS, AND NON-TRANSITORY COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 15/954,937

(22) Filed: Apr. 17, 2018

(65) Prior Publication Data

US 2018/0308242 A1 Oct. 25, 2018

(30) Foreign Application Priority Data

Apr. 25, 2017 (JP) .................. 2017-086547

(51) Int. Cl.
 *G06T 7/254* (2017.01)
 *G06T 7/246* (2017.01)
 *G06T 7/00* (2017.01)

(52) U.S. Cl.
 CPC .............. *G06T 7/251* (2017.01); *G06T 7/254* (2017.01); *G06T 7/97* (2017.01); *G06T 2207/10004* (2013.01); *G06T 2207/20021* (2013.01)

(58) Field of Classification Search
 None
 See application file for complete search history.

(56) References Cited

U.S. PATENT DOCUMENTS

| 2010/0296698 | A1  | 11/2010 | Lien et al. |
| 2011/0243383 | A1  | 10/2011 | Oyaizu |
| 2013/0011049 | A1* | 1/2013  | Kimura ............... G06T 7/194 382/155 |
| 2015/0131961 | A1* | 5/2015  | Geissler .............. H04N 5/2224 386/223 |
| 2015/0220789 | A1  | 8/2015  | Wood et al. |

(Continued)

FOREIGN PATENT DOCUMENTS

| EP | 2555162 A1 * | 2/2013 | ............. G06T 7/254 |
| JP | 5391966 B2   | 1/2014 | |

OTHER PUBLICATIONS

Extended European Search Report issued in corresponding EP application No. 18165394.1 dated Jul. 12, 2018, 12 pages.

*Primary Examiner* — Bernard Krasnic
(74) *Attorney, Agent, or Firm* — Carter, DeLuca & Farrell LLP

(57) ABSTRACT

A moving object detection apparatus has a generation unit that generates a background model based on a feature of a background region of a captured image that is captured by image capturing unit, a detection unit that detects a moving object region from an image input using an input unit, based on the background model, and a determination unit that determines whether to cause the generation unit to newly generate a background model, based on an amount of change in the moving object region detected by the detection unit for a first image and a second image captured at different times and input using the input unit.

12 Claims, 7 Drawing Sheets

(56) References Cited

U.S. PATENT DOCUMENTS

| | | | |
|---|---|---|---|
| 2016/0028968 A1* | 1/2016 | Affaticati | H04N 5/2723 348/47 |
| 2016/0171332 A1* | 6/2016 | Kawano | G06T 7/254 382/173 |
| 2016/0210759 A1* | 7/2016 | Baek | G06K 9/6202 |
| 2017/0213100 A1* | 7/2017 | Yun | G06T 7/194 |

* cited by examiner

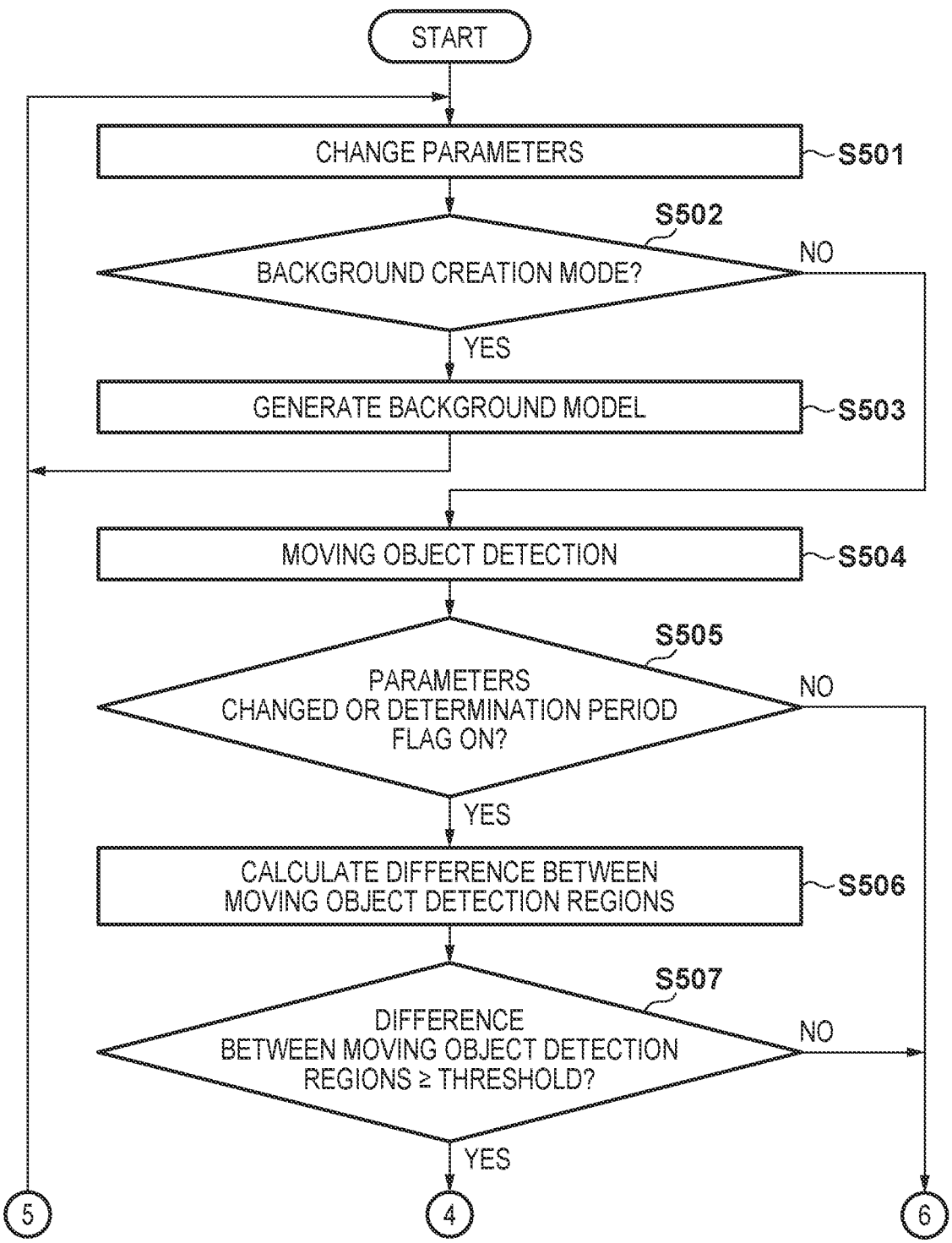
F I G. 5A

MOVING OBJECT DETECTION APPARATUS, CONTROL METHOD FOR MOVING OBJECT DETECTION APPARATUS, AND NON-TRANSITORY COMPUTER-READABLE STORAGE MEDIUM

BACKGROUND OF THE INVENTION

Field of the Invention

The present invention relates to a moving object detection apparatus, a control method for a moving object detection apparatus, and a non-transitory computer-readable storage medium.

Description of the Related Art

In recent years, processing such as image analysis for detecting and tracking an object using images captured by a surveillance camera and event analysis using the results of such image analysis have been performed. One moving object detection technology that is used in image analysis is a background subtraction method. The background subtraction method involves creating a background model from a background image in which moving objects have been removed, and detecting a moving object region (foreground region) from the difference between the background model and an input image.

Usually, a perfect background image in which objects have been removed is difficult to obtain with one input image, and the background image also changes due to changes in the environment. Thus, the background model is modified to follow changes in the environment, by successively updating the background model. Japanese Patent No. 5391966 (Hereinafter, Document 1) discloses a technology in which luminance values before and after a change in brightness are used to infer a background model when recreating the background image in response to the change in brightness, with respect to a region in which the background cannot be created due to being blocked by a mobile object.

However, in the case where there are periodical changes in brightness, for example, storing the background models before and after the changes in brightness and reusing the stored background models according to the brightness is effective from the viewpoint of calculation costs saved by being able to omit inference processing. That is, there are cases where a method that involves continually inferring and using background models such as in Document 1 becomes inefficient. In view of this, in moving object detection, a technology is desired that enables it to be reliably judged whether the background model that has been used to date needs to be regenerated, or whether a stored background model can be reused.

SUMMARY OF THE INVENTION

According to one embodiment of the present invention, it becomes possible to more reliably judge whether to regenerate a background model for moving object detection.

According to one aspect of the present invention, there is provided a moving object detection apparatus comprising: a generating unit configured to generate a background model based on a feature of a background region of an image that is captured by an image capturing unit; a detecting unit configured to detect a moving object region from an image based on the background model; and a determining unit configured to determine whether to cause the generating unit to newly generate a background model, based on an amount of change in the moving object region detected by the detecting unit for a first image and a second image captured at different times.

According to another aspect of the present invention, there is provided a control method for a moving object detection apparatus, comprising: generating a background model based on a feature of a background region of an image that is captured by an image capturing unit; detecting a moving object region from an image based on the background model; and determining whether to cause generation of a new background model in the generating be executed, based on an amount of change in the moving object region detected for a first image and a second image captured at different times.

Furthermore, according to another aspect of the present invention, there is provided a non-transitory computer-readable storage medium storing a program for causing a computer to execute a control method for a moving object detection apparatus, the method comprising: generating a background model based on a feature of a background region of an image that is captured by an image capturing unit; detecting a moving object region from an image based on the background model; and determining whether to cause generation of a new background model in the generating to be executed, based on an amount of change in the moving object region detected for a first image and a second image captured at different times.

Further features of the present invention will become apparent from the following description of exemplary embodiments (with reference to the attached drawings).

BRIEF DESCRIPTION OF THE DRAWINGS

FIGS. 5A and 5B are flowcharts of processing that is performed by a moving object detection system according to a third embodiment.

DESCRIPTION OF THE EMBODIMENTS

Hereinafter, embodiments of the present invention will be described with reference to the accompanying drawings. Note that the embodiments described below illustrate examples of specific instances in which the present invention is carried out, and are working examples of the configuration recited in the claims.

First Embodiment

Figure 1:
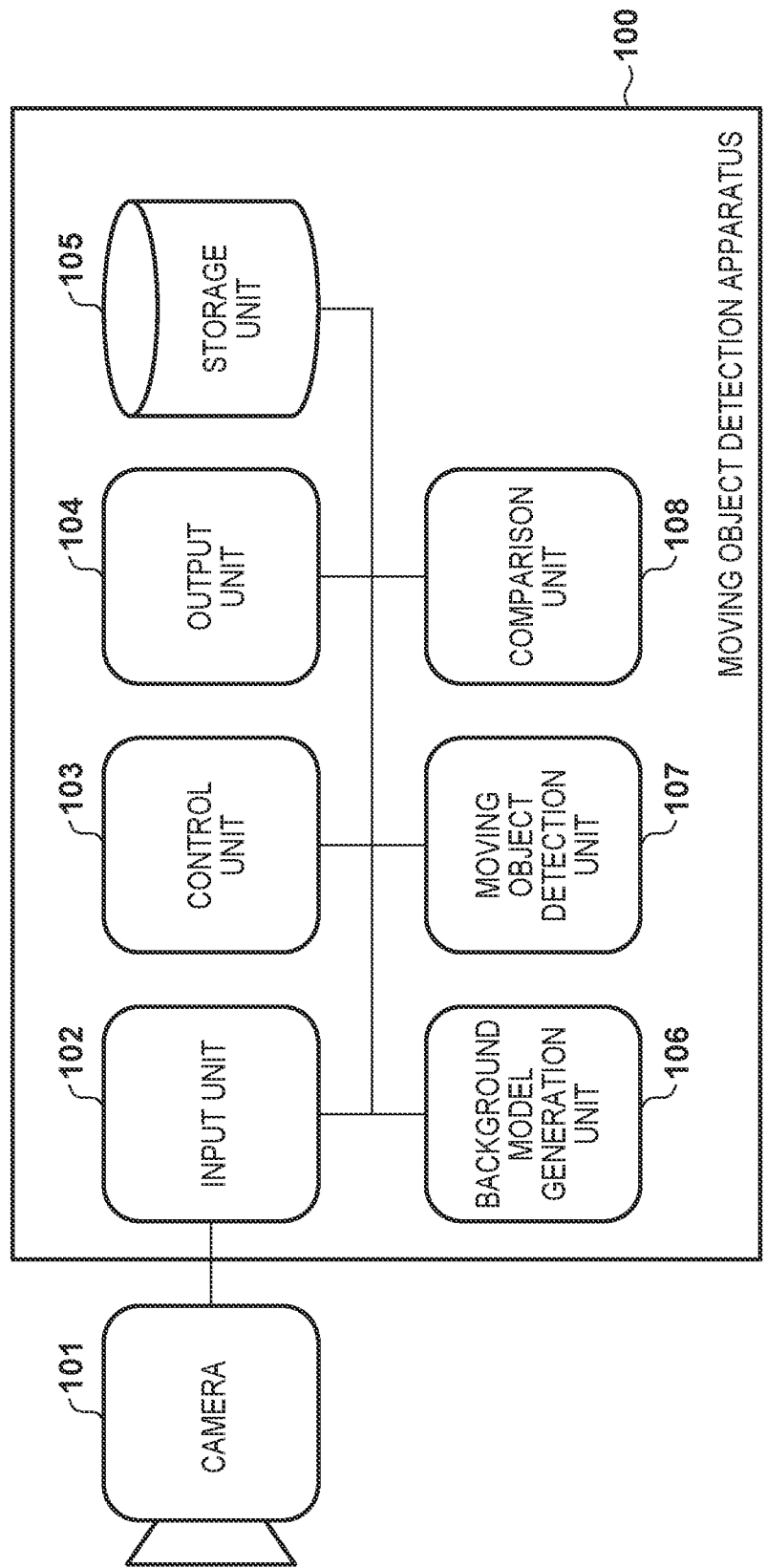
FIG. 1 is a block diagram showing an exemplary configuration of a moving object detection system according to an embodiment.

An exemplary configuration of a moving object detection system according to a first embodiment will be described using the block diagram of FIG. 1. The moving object detection system has a moving object detection apparatus 100 and a camera 101. The moving object detection apparatus 100 has an input unit 102, a control unit 103, an output unit 104, a storage unit 105, a background model generation unit 106, a moving object detection unit 107, and a comparison unit 108. The moving object detection apparatus 100 detects a moving object using a background subtraction method from an image acquired by the camera 101, and provides a user with a detection result. Note that since the background subtraction method is a well-known technology, detailed description thereof will be omitted. Note that the "moving object" described in the present embodiment refers to a foreground region detected with the background subtraction method, and is defined as a movable object.

The camera 101 captures a still image or a moving image in an orientation that is set or controlled. In the present embodiment, the camera 101 is given as having a mode (hereinafter, RGB mode) for acquiring an RGB video and a mode (hereinafter, infrared mode) for acquiring an infrared video. The camera 101 outputs captured images together with a frame number.

In the moving object detection apparatus 100, the input unit 102 has the function of a camera I/F that receives input of images captured by the camera 101. Also, the input unit 102 receives commands from a user (e.g., RGB mode/infrared mode switching command, position and orientation control command including pan/tilt/zoom setting values, etc., for the camera 101). The control unit 103 includes a CPU and a memory which are not shown, and controls the constituent elements of the moving object detection apparatus 100 as a result of the CPU executing programs stored in the memory. For example, the control unit 103 controls the camera 101 on the basis of commands received with the input unit 102. The output unit 104 is connected to a display apparatus (not shown), and causes images captured with the camera 101 to be displayed on the display apparatus and displays a moving object detection result in a superimposed manner. The storage unit 105 is constituted by a hard disk, for example, and stores information that is output from the constituent elements (e.g., images captured with the camera 101, background models generated with the background model generation unit 106, etc.).

The background model generation unit 106 generates and updates background models that are required in moving object detection processing by the background subtraction method, based on features of the background region of images input using the input unit 102. A background model here is an image feature amount for every block obtained when a captured image (hereinafter, input image) that is captured with the camera 101 and input to the moving object detection apparatus 100 via the input unit 102 is divided by a predetermined division number into blocks. In the present embodiment, averages (hereinafter, RGB color averages) of the color components of respective RGB pixels within each block are used as image feature amounts for the block.

Also, the background model generation unit 106 holds a learning period flag. The initial value of the learning period flag is ON. While the learning period flag is ON, the background model generation unit 106 newly generates a background model from input images, assuming that the input images do not have a moving object region. Specifically, the average value of the feature amounts of each block of a plurality of input images is saved as the feature amount of the background model corresponding to that block. That is, since feature amounts need to be collected from a plurality of input images in the case of newly generating a background model, a certain learning period is needed.

The learning period flag changes to OFF when a predetermined period elapses. When the learning period flag is OFF, the average of the feature amount of a block determined to be the background of an input image and the feature amount of the background model corresponding to that block is calculated, and the calculation result is saved as the feature amount of the updated background model. The background model is thus successively updated. As described above, the background model generation unit 106 newly "generates" a background model while the learning period flag is ON, and "updates" the background model while the learning period flag is OFF. Generally, the time taken to perform moving object detection after newly generating a background model is set to be shorter than the time it takes to suppress misdetection after the background is updated. This is in order to be able to start moving object detection as early as possible at startup, at the same time as reducing the influence of misdetection caused by noise as much as possible.

The moving object detection unit 107 detects a moving object region from an input image using a background model. The moving object detection unit 107, first, divides the input image by a predetermined division number into blocks, and acquires the RGB color averages of the pixels within the respective block regions as feature amounts. The moving object detection unit 107 then calculates the difference between the feature amount of each block and the feature amount of the background model corresponding to the block. The moving object detection unit 107 determines blocks whose difference does not exceed a predetermined threshold to be background, and blocks whose difference exceeds the predetermined threshold to be foreground (moving object). The moving object detection unit 107 then outputs a binary moving object detection result designating background/moving object for every block.

The comparison unit 108 calculates the ratio of the area of the moving object region relative to the entire image for the moving object detection results of two arbitrary input images, and calculates the difference between these ratios. In the present embodiment, the difference is calculated based on the equation showing in the following equation (1). Note that, in the following equation (1), diff is the difference between the ratios of the area of the moving object regions of the two arbitrary moving object detection results, $\Sigma n$ is the total number of blocks, and $\Sigma f1$ and $\Sigma f2$ are the numbers of blocks determined to be a moving object in the respective moving object detection results. The comparison unit 108 compares the calculated difference between the ratios of the area of the moving object regions with a threshold (a fixed value in the present embodiment), and outputs the comparison result (greater than or equal to threshold or less than threshold).

$$diff = \frac{|\sum f1 - \sum f2|}{\sum n} \quad (1)$$

Note that the abovementioned constituent elements of the moving object detection apparatus 100 are communicably connected to each other. Also, the background model generation unit 106, the moving object detection unit 107 and the comparison unit 108 may be realized by dedicated hardware, or some or all of the functions thereof may be realized by the CPU of the control unit 103 executing programs stored in the memory.

Next, processing that is performed by the moving object detection apparatus 100 will be described in accordance with the flowchart of FIG. 2.

In step S201, the control unit 103 changes the parameters of the camera 101 in accordance with commands input with the input unit 102. For example, in the case where a change command to change from the RGB mode to the infrared mode is issued by the input unit 102, the control unit 103 changes the camera 101 to the infrared mode. If a change in parameters is not instructed, there is no change in the operations of the camera 101. In step S202, the background model generation unit 106 determines whether the learning period flag is ON. If the learning period flag is ON, it is determined to be a background creation mode, and the processing transitions to step S203. On the other hand, if the learning period flag is OFF, the processing transitions to step S204.

In step S203, the background model generation unit 106 generates a background model from input images that are input from the camera 101, and saves the background model to the storage unit 105. Also, the background model generation unit 106 measures the time from when this step is initially executed with the learning period flag in an ON state, and, after a predetermined period (e.g., 10 seconds), sets the learning period flag to OFF, and ends the background creation mode. During the predetermined period, the moving object detection apparatus 100 continues to create the background model from input images, without performing moving object detection.

Figure 3A:
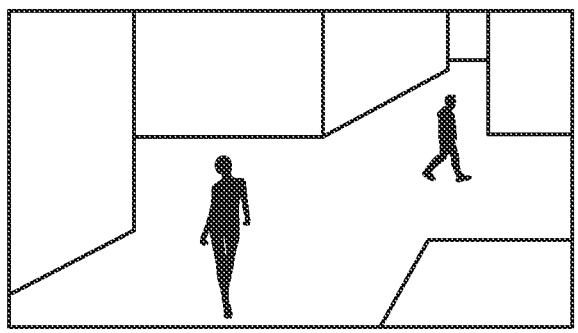
FIGS. 3A to 3D are diagrams showing an exemplary processing result of moving object detection.
Figure 3B:
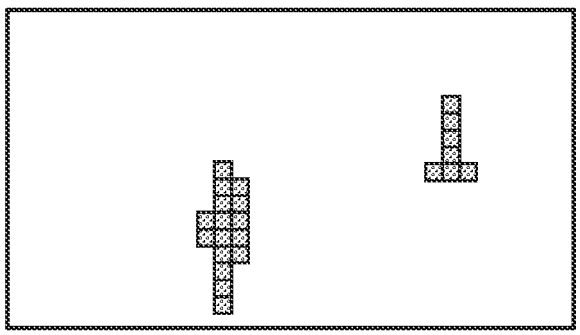

In step S204, the moving object detection unit 107 performs moving object detection processing, using the input image (FIG. 3A) that is transmitted together with a frame number from the camera 101, and the background model that is saved to the storage unit 105. The moving object detection result is saved to the storage unit 105 together with the frame number of the input image. An example of the processing result at this time is shown in FIG. 3B. Thereafter, the background model generation unit 106 updates the background model in relation to the blocks determined to be background.

In step S205, the control unit 103 determines whether the camera 101 was controlled in step S201, that is, whether the parameters were changed. If it is determined that the parameters of the camera 101 were changed, the processing transitions to step S206, and if it is determined that the parameters of the camera 101 were not changed, the processing transitions to step S209. In steps S206 to S208, the amount of change in the moving object region detected by the moving object detection unit 107 is calculated for a first image and a second image captured at different times, and it is determined whether to newly generate a background model based on the calculated amount of change. Also, this determination is executed in response to a change in parameters being input from the input unit 102 (S205).

Figure 3C:
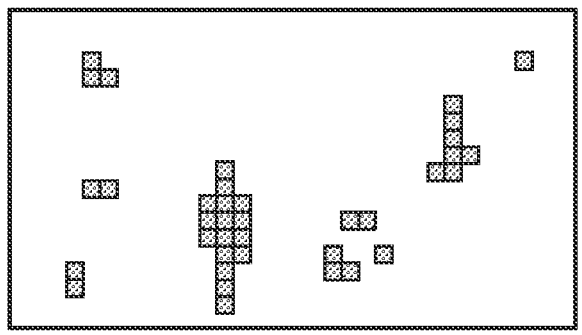
Figure 3D:
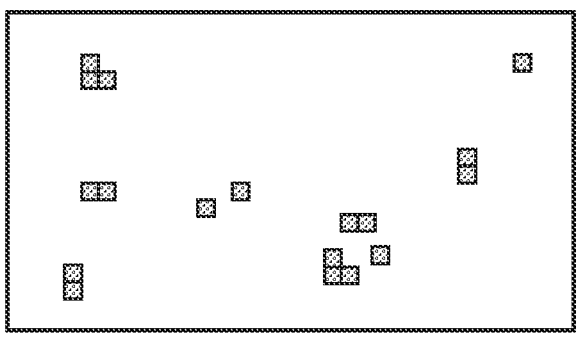

In step S206, the comparison unit 108 calculates the difference between the ratios of the area of the moving object regions of the moving object detection result of one frame previous (hereinafter, the previous frame) that is stored in the storage unit 105 and the moving object detection result of the frame that is currently being processed (hereinafter, the current frame) in accordance with the above equation (1). For example, assume that the area of the moving object region of the moving object detection result in the previous frame (FIG. 3B) is 0.03, and that the area of the moving object region of the moving object detection result (FIG. 3C) in the current frame is 0.1. In this case, the difference between the moving object regions of the moving object detection results will be as shown in FIG. 3D, and the difference between the ratios of the area of the moving object regions of the moving object detection results is 0.07.

In step S207, the background model generation unit 106 determines whether the difference between the ratios of the area of the moving object regions calculated in step S206 is greater than or equal to a threshold. If it is determined that the difference is greater than or equal to the threshold, the processing transitions to step S208, and if is determined that the difference is less than the threshold, the processing transitions to step S209.

In step S208, the background model generation unit 106 clears the background model in the storage unit 105 (resets the background model), and sets the learning period flag to ON. As a result, when the processing returns to step S201, the background model generation unit 106 regenerates the background model. It is thus determined whether to generate a background model, based on the amount of change in the moving object regions detected in a first image captured before the change in parameters and a second image captured after the change in parameters. That is, the background model generation unit 106 determines to regenerate the background model in the case where the parameters of the camera 101 have been changed and the amount of change in the detected moving object regions is greater than or equal to a threshold, and newly generates a background model. In the case where it is determined to generate a new background model (when the learning period flag changes to ON), a background model is generated using images that are input during a predetermined period (period during which the learning period flag is ON) as the background image.

In step S209, the output unit 104 outputs the moving object detection result stored in the storage unit 105 in step S204 together with the input image. For example, the output unit 104 causes the input image to be displayed on the display apparatus, and further causes the moving object detection result to be displayed in a superimposed manner. In step S210, in the case where the input unit 102 has received an end command from the user, the control unit 103 ends this processing. If this is not the case, the control unit 103 increments the frame number, and returns the processing to step S201.

Variations

Although, in the abovementioned embodiment, the change in camera modes between the RGB mode and the infrared mode is given as a change in the image capturing parameters for determining whether to generate a background model, the present invention is, of course, not limited thereto. For example, any mode (parameter) that possibly causes a change in the image may be used, such as F value, shutter speed, ISO speed, exposure, change in focus, HDR (high dynamic range) mode or switching of filters. It is also possible to target changes in the setting values of the camera, both automatic and manual, such as changes in the white balance setting value or in the exposure setting value in response to a change in the brightness of the image capturing environment. Also, changes in the image due to changes in the pan/tilt/zoom of the camera may be targeted.

Also, although, in the abovementioned embodiment, a background model is given as information that is set for every block obtained when an input image is divided by a predetermined division number into blocks, the present invention is not limited thereto. For example, other small region segmentation methods such as Superpixel may be used, and a background model may, of course, be given as information that is set in pixel units. Also, although the image feature amounts that are stored are given as the RGB color averages of pixels within a block, the present invention is not limited thereto, and other feature amounts may be used, such as RGB chromatic dispersion values.

Also, although, in the abovementioned embodiment, the equation for calculating the difference between the ratios of the area of the moving object regions of two arbitrary frame images is defined such as equation (1), the present invention is not limited thereto. For example, a configuration may be adopted in which a bounding rectangle containing a set of blocks that are determined to be a moving object is managed as a moving object region, and the difference between ratios of the area of moving object regions is calculated using the area of the rectangle.

Also, although, in the abovementioned embodiment, the threshold that is for determining whether it is necessary to regenerate the background model and is compared with the difference between the ratios of the area of moving object regions is given as being fixed, the present invention is not limited thereto. For example, the threshold may vary according to the state of the previous frame, as given below.

Threshold value=(ratio of moving object region of previous frame)×$x$ (%)

Also, although, in the abovementioned embodiment, determination of whether to generate a background model is performed in the case where there is a change in parameters, the present invention is not limited thereto. For example, a configuration may be adopted in which determination of whether to generate a background model (S206 to S208) is executed every predetermined time interval. In this case, in the calculation of the difference between moving object detection regions that is executed in step S206, the difference between the moving object region detected in step S204 and the moving object region detected at the timing of the previous determination is calculated, for example.

Second Embodiment

In a second embodiment, operations of a moving object detection system that has a function of saving/loading a background model according to the modes of a camera 101 will be described. The configurations of the moving object detection system and a moving object detection apparatus 100 are similar to the first embodiment (FIG. 1). Hereinafter, description will predominantly focus on differences from the first embodiment. Also, in the second embodiment, in order to simplify the description, control (change in parameters) on the camera 101 will only target switching between the RGB mode and the infrared mode.

Figure 4A:
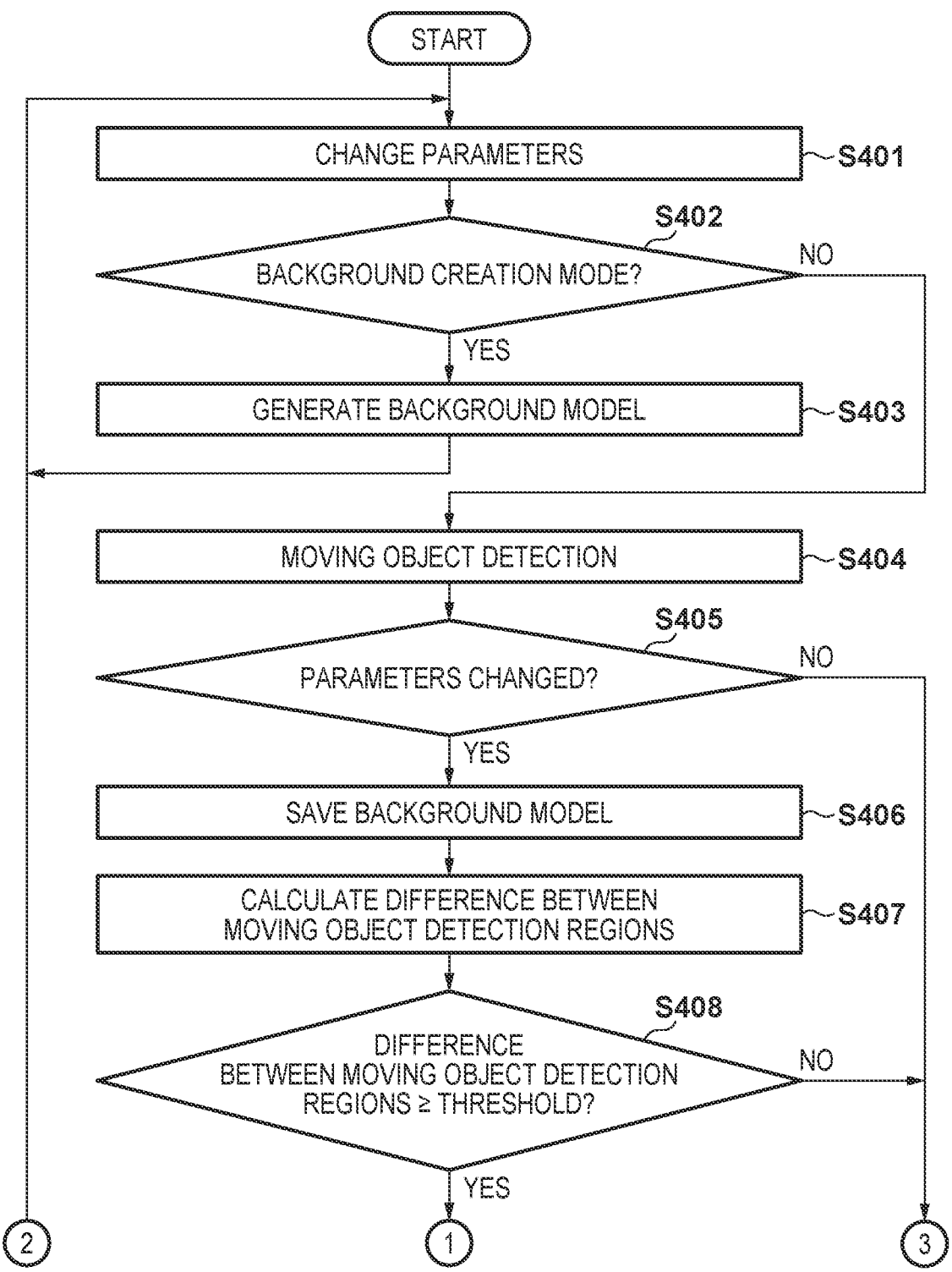
FIGS. 4A and 4B are flowcharts of processing that is performed by a moving object detection system according to a second embodiment.
Figure 4B:
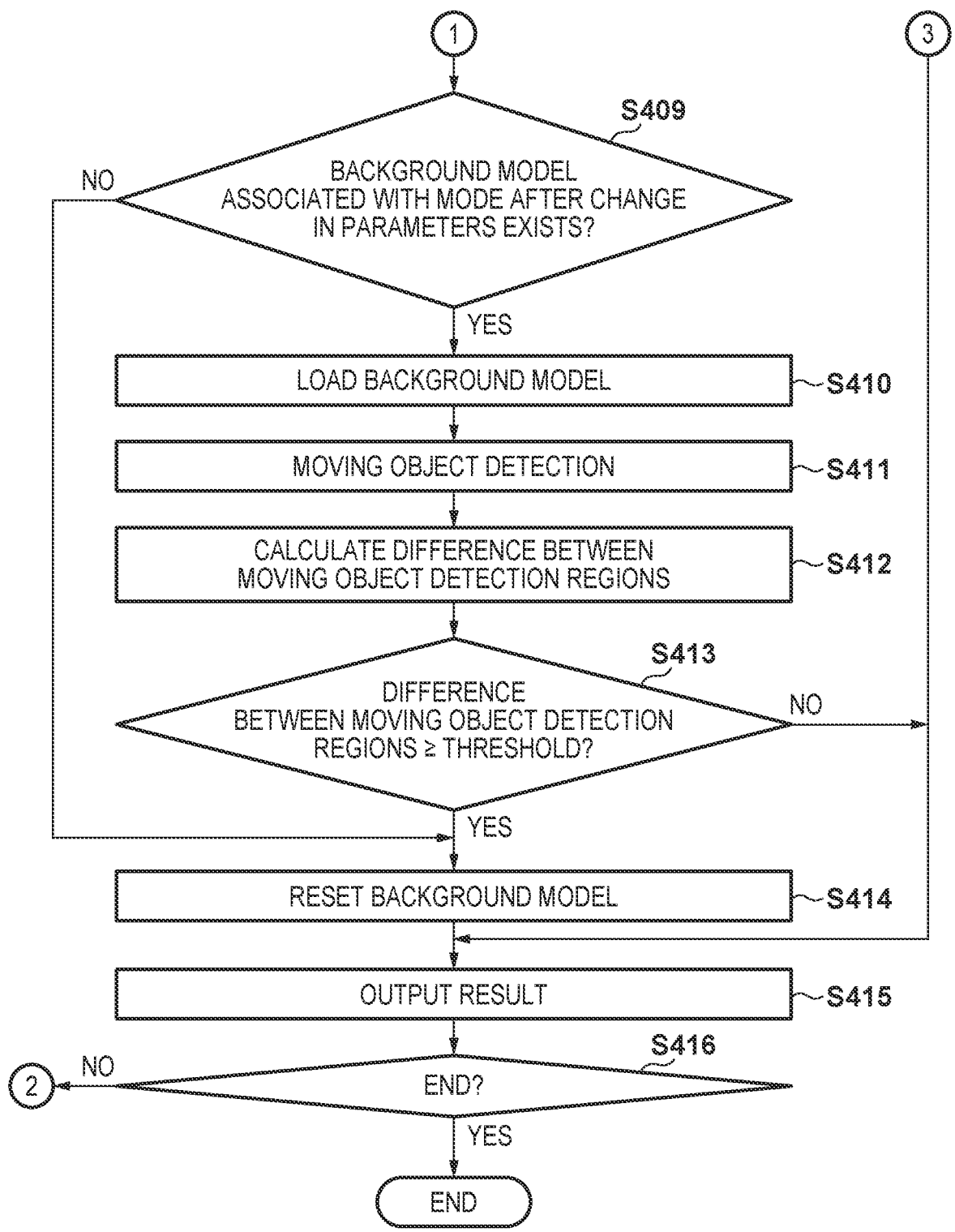

Next, processing that is performed by the moving object detection system of the second embodiment will be described in accordance with the flowcharts of FIGS. 4A and 4B.

Figure 2:
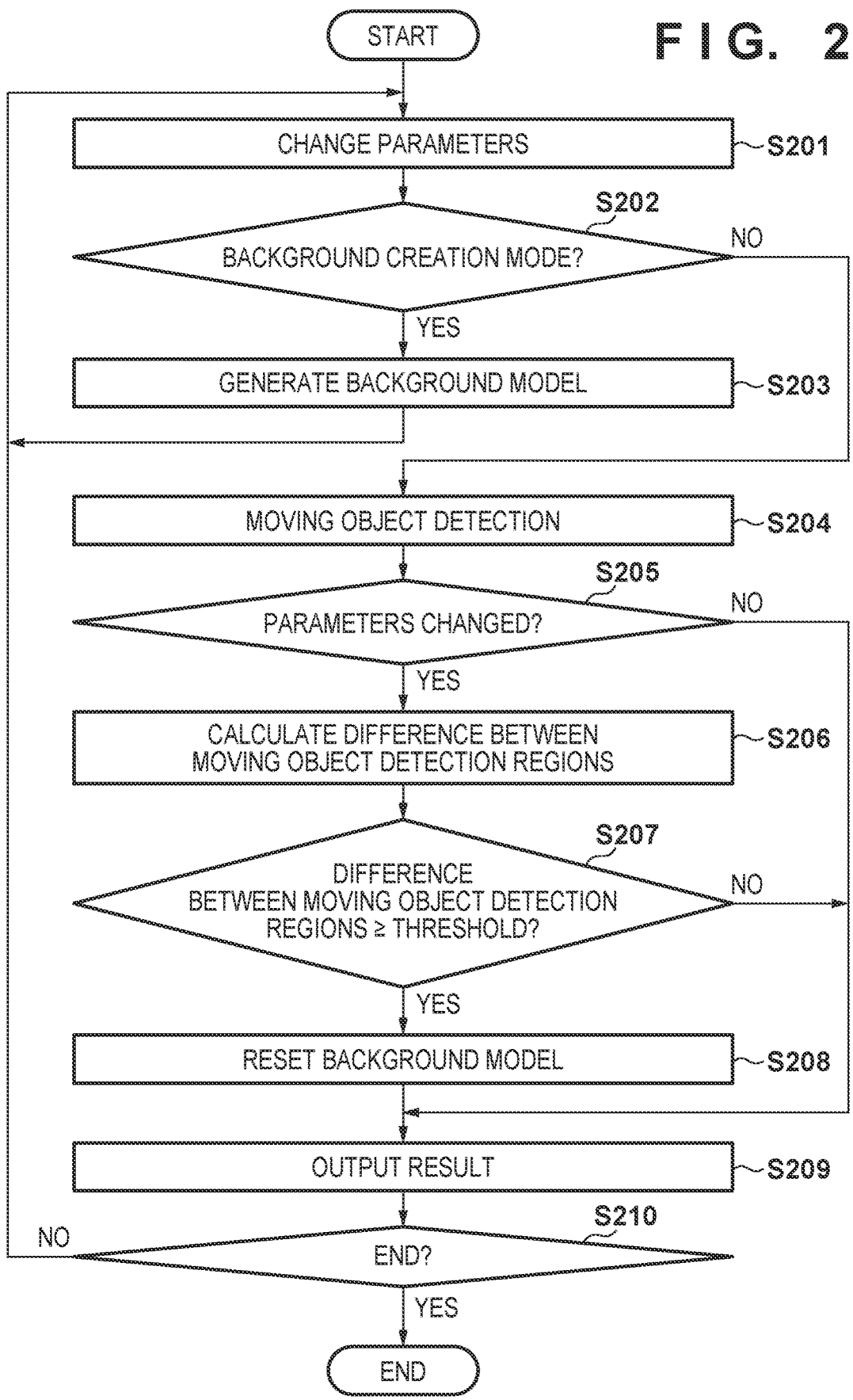
FIG. 2 is a flowchart of processing that is performed by a moving object detection apparatus according to a first embodiment.

The processing of steps S401 to S405 is similar to the processing of steps S201 to S205 of the first embodiment (FIG. 2). That is, the background model generation unit 106 generates a background model from input images while the learning period flag is ON (steps S401 to S403). When the learning period flag changes to OFF, the moving object detection unit 107 performs moving object detection from the input image (step S404), and thereafter determines whether the mode of the camera 101 has been switched (whether the parameters have been changed) (step S405).

In step S406, the comparison unit 108 saves the background model currently stored in the storage unit 105 to a different area (storage area) of the storage unit 105 in association with the mode (image capturing parameters) before mode switching of the camera 101. For example, in the case where this step is executed after the mode of the camera 101 is switched from the RGB mode to the infrared mode, the comparison unit 108 saves the background model that is currently stored in the storage unit 105 to another area of the storage unit 105, as the background model of the RGB mode. The background model that is currently being used is thus saved in response to a change in parameters in association with the parameters before the change.

Steps S407 and S408 are respectively similar to steps S206 and S207. That is, the comparison unit 108 calculates the difference between the ratios of the area of the moving object regions of the moving object detection result of the previous frame stored in the storage unit 105 and the moving object detection result of the current frame (step S407), and determines whether the calculation result is greater than or equal to a threshold (step S408). If the difference is greater than or equal to the threshold, the processing transitions to step S409, and, if less than the threshold, the processing transitions to step S415.

In step S409, the comparison unit 108 checks whether a background model associated with the mode after the change in parameters is stored in the storage unit 105. If a background model associated with the mode after the change is stored, the processing transitions to step S410, and, if not stored, the processing transitions to step S414. For example, if a background model associated with the infrared mode is stored in the storage unit 105 in the case where this step is executed after switching from the RGB mode to the infrared mode, the processing transitions to step S410, and, if not stored, the processing transitions to step S414.

In steps S410 and S411, the moving object detection unit 107 acquires the background model corresponding to the parameters after the change from the storage area of the storage unit 105, and detects a moving object region from the input image. That is, in step S410, the comparison unit 108 loads the background model associated with the mode after the change in parameters from the storage unit 105, and replaces the background model currently being used. In step S411, the moving object detection unit 107 performs moving object detection processing, using the input image from the camera 101 and the background model that replaced the background model that was being used in step S410. In step S412, the comparison unit 108 calculates the difference between the ratios of the area of the moving object regions of the moving object detection result of the previous frame stored in the storage unit 105 and the moving object detection result obtained in step S411 in accordance with equation (1).

The processing of steps S413 to S416 is similar to the processing of steps S207 to S210 in FIG. 2. That is, the background model generation unit 106, in the case where the difference between the ratios of the area of the moving object regions calculated in step S412 is greater than or equal to a threshold (YES in step S413), clears the background model, and sets the learning period flag to ON (step S414). Thereafter, the output unit 104 outputs the moving object detection result (step S415), and the control unit 103 determines whether to end the processing in accordance with a command from the user (step S416).

Variations

In the abovementioned second embodiment, in the case where the amount of change in the moving object region detected by the moving object detection unit from the input image using the background model corresponding to the parameters before the change is smaller than the threshold, that background model continues to be used. That is, moving object detection is performed in response to the mode (parameters) of the camera having been changed, and in the case where the amount of change in the moving object region is greater than or equal to the threshold, moving object detection is performed with the background model corresponding to the mode after the change, and it is judged whether to regenerate the background model. However, the present invention is not limited thereto. A configuration may be adopted such that, in the case where it is detected that the mode has been changed, the current background model is immediately saved, moving object detection is performed after loading the background model corresponding to the mode after the change, and it is judged whether to regenerate the background model. In this case, in the flowcharts of FIGS. 4A and 4B, steps S404, S407 and S408 can be omitted, and the processing can skip to step S414 in the case of NO in step S409.

Also, although, in the abovementioned second embodiment, control on the camera 101 targeted switching between the RGB mode and the infrared mode, the present invention is not limited thereto. Similarly to the variations of the first embodiment, any mode that possibly causes a change in the image is applicable. For example, it is possible to target changes in the pan/tilt/zoom of the camera, in which case a configuration may be adopted in which a background model is stored in response to a control value on the pan/tilt/zoom of the camera.

Third Embodiment

In a third embodiment, it is judged whether to regenerate a background model using a plurality of input images. Note that the configurations of a moving object detection system and a moving object detection apparatus 100 of the third embodiment are similar to the first embodiment (FIG. 1). Hereinafter, description will predominantly focus on the differences from the first and second embodiments, and the present embodiment is hereinafter assumed to be similar to the first and second embodiments unless specifically stated otherwise.

In the third embodiment, the storage unit 105 holds a determination count and a determination period flag. The determination count represents the number of times that the difference between the ratios of the area of the moving object regions of the moving object detection results of the previous frame and the current frame was greater than or equal to a threshold. The determination period flag is a flag that is ON during the period in which the determination of whether the difference between the ratios of the area of the moving object regions of the moving object detection results of the previous frame and the current frame is greater than or equal to the threshold is performed, and is OFF during the period in which this determination is not performed. The following condition, for example, can thereby be set: Newly generate a background model when the number of times that it is determined that the difference between the ratios of the area of the moving object regions detected from the previous frame and the current frame is greater than or equal to the threshold exceeds 4 during the period from when the parameters are changed until the 10th frame. In this case, the determination period flag changes to ON at the stage that the change in parameters occurs. In the case where the 10th frame arrives without the determination count reaching 4 or the determination count reaches 4 before the 10th frame, the determination period flag changes to OFF.

Figure 5B:
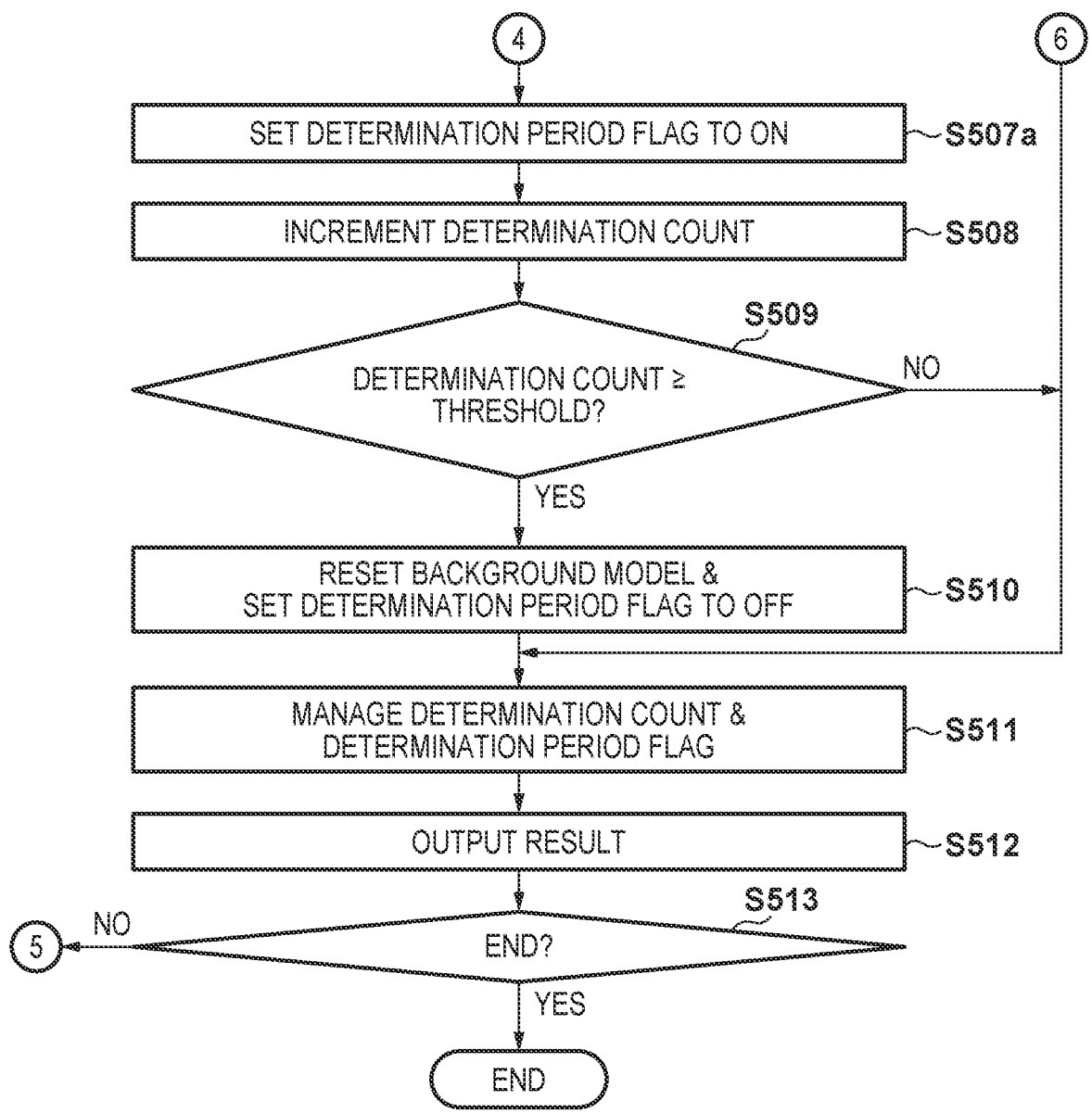

Next, processing that is performed by the moving object detection apparatus 100 of the third embodiment will be described in accordance with the flowcharts of FIGS. 5A and 5B.

The processing of steps S501 to S504 is similar to the processing of steps S201 to S204 of the first embodiment (FIG. 2). That is, the background model generation unit 106 generates a background model from input images while the learning period flag is ON (steps S501 to S503). When the learning period flag changes to OFF, the moving object detection unit 107 performs moving object detection from the input image (step S504).

In step S505, the control unit 103 determines whether the camera 101 has been controlled (whether the parameters have been changed) or whether the determination period flag is ON. In the case where the camera 101 has been controlled or the determination period flag is ON, the processing transitions to step S506, and, in the case where the camera 101 has not been controlled and the determination period flag is OFF, the processing transitions to step S511.

The processing of step S506 is similar to step S206. That is, the comparison unit 108 calculates the difference between the ratios of the area of the moving object regions of the moving object detection result of the previous frame stored in the storage unit 105 and the moving object detection result of the current frame. Note that the ratio of the moving object region detected from the image before the change in parameters is used for the moving object detection result of the previous frame. That is, in step S506, the moving object detection result of the latest frame after the change in parameters and the moving object detection result of the frame immediately previous to the change in parameters are used, and the difference between the ratios of the area of the moving object regions is calculated. In other words, it is determined whether to generate a new background model based on the number of images in which the amount of change in the ratios of the moving object regions is greater than or equal to the threshold, among a plurality of images obtained after the change in parameters, within a predetermined period after the change in parameters (period during which the determination period flag is ON). In the case where the difference in the ratios of the area of the moving object regions calculated in step S506 is greater than or equal to the threshold, the processing transitions from step S507 to step S507a. Also, in the case where the difference in the ratios of the area of the moving object regions calculated in step S506 is less than the threshold, the processing transitions from step S507 to step S511. In step S507a, in the case where the determination period flag is OFF, the control unit 103 sets the determination period flag to ON, and saves the frame number at that time to the storage unit 105. Thereafter, the processing advances to step S508.

The background model generation unit 106 increments the determination count in step S508, and determines whether the determination count exceeds the threshold in step S509. If it is determined that the determination count exceeds the threshold, the processing transitions to step S510, and, if it is determined that the determination count does not exceed the threshold, the processing transitions to step S511. In step S510, the background model generation unit 106 clears the current background model, similarly to step S208. Also, the control unit 103 sets the determination period flag to OFF.

In step S511, the control unit 103 updates the determination period flag. If the determination period flag is ON when step S511 is executed, the number of processed frames from when the determination period flag changed to ON (number of times that a difference occurred) is calculated, and if the number of processed frames exceeds a given number, the determination period flag is set to OFF and the determination count is set to 0. No processing is performed if the determination period flag is OFF when step S511 is executed.

Steps S512 and S513 are similar to steps S209 and S210 in FIG. 2. That is, the moving object detection result is output and it is determined whether to end the processing in accordance with a command from the user. As described above, in the third embodiment, it is determined whether to generate a new background model, based on the number of images (determination count) in which the amount of change in the moving object region is greater than or equal to a threshold, among the images input within a predetermined period after the change in parameters (period during which the determination period flag is ON).

As described above, according to the above embodiments, it is judged whether the background model that has been used to date is valid based on the amount of change in the moving object region. The background model is reused if judged to be valid, and the background model is regenerated if judged to be invalid. Accordingly, the frequency with which new background models are generated decreases, and it becomes possible to reduce the learning period for background model generation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086547, filed Apr. 25, 2017, which is hereby incorporated by reference herein in its entirety.

What is claimed is:

1. A moving object detection apparatus comprising:
at least one processor or circuitry to perform operations of:
an input unit configured to input an image captured by a capturing unit and to set an image capturing parameter;
a generating unit configured to generate a background model based on a feature of a background region of the image that is input by the input unit;
a saving unit configured to save, in a memory, a background model in association with the image capturing parameter;
a detecting unit configured to detect a moving object region from an image input by the input unit based on the background model; and
a determining unit configured to determine, in a case where the image capturing parameter set by the input unit is changed, whether to cause the detecting unit to use a background model saved in the memory, based on an amount of change in the moving object region detected by the detecting unit for a first image which is captured before the image capturing parameter is changed and a second image which is captured after the image capturing parameter is change,
wherein in a case where the image capturing parameter set by the input unit is changed, the detecting unit acquires a background model corresponding to the changed image capturing parameter from the memory, and detects a moving object region from the second image using the acquired background model.

2. The apparatus according to claim 1, wherein the saving unit, in response to the change in the image capturing parameter, saves the background model currently being used in the memory in association with the image capturing parameter before the change.

3. The apparatus according to claim 1, wherein the determining unit, in a case where the amount of change in the moving object region detected by the detecting unit for the first image and the second image using a background model corresponding to the image capturing parameter before the change is smaller than a threshold, causes the detecting unit to continue using the background model currently being used.

4. The apparatus according to claim 1, wherein the determining unit determines to cause the generating unit to generate a new background model, in a case where the amount of change in the moving object region is greater than or equal to a threshold.

5. The apparatus according to claim 4, wherein the threshold used by the determining unit is a fixed value determined in advance.

6. The apparatus according to claim 4, wherein the threshold used by the determining unit is set based on a ratio of the moving object region in the first image.

7. The apparatus according to claim 1, wherein the determining unit determines whether to cause the generating unit to generate a new background model to be used in the detection unit, based on a number of images in which the amount of change in the moving object region is greater than or equal to a threshold, among a plurality of images obtained as the second image within a predetermined period after the change in the image capturing parameter.

8. The apparatus according to claim 7, wherein the determining unit determines to cause the generating unit to generate a new background model, in a case where the number of the images is greater than or equal to a threshold.

9. The apparatus according to claim 7,
wherein in a case where it is determined by the determining unit to generate a new background model, the generating unit generates a background model using images input during a predetermined period as a background image.

10. The apparatus according to claim 1,
wherein the image capturing parameter includes at least one of an RGB (Red, Green, Blue) mode, an infrared mode, an F value, a shutter speed, an ISO speed, an exposure, a change in focus, a high dynamic range mode, and a switching of filters, wherein the F value represents a relative aperture.

11. A control method for a moving object detection apparatus, comprising:
inputting an image captured by a capturing unit and setting an image capturing parameter;
generating a background model based on a feature of a background region of the image that is input by the inputting;
saving, in a memory, a background model in association with the image capturing parameter;
detecting a moving object region from an image input by the inputting based on the background model; and
determining, in a case where the image capturing parameter set in the setting is changed, whether to use a background model saved in the memory for detecting the moving object region, based on an amount of change in the moving object region detected for a first image which is captured before the image capturing parameter is changed and a second image which is captured after the image capturing parameter is changed,
wherein in a case where the image capturing parameter set by the setting is changed, a background model corresponding to the changed image capturing parameter is acquired from the memory, and a moving object region is detected from the second image using the acquired background model.

12. A non-transitory computer-readable storage medium storing a program for causing a computer to execute a control method for a moving object detection apparatus, the method comprising:
inputting an image captured by a capturing unit and setting an image capturing parameter;
generating a background model based on a feature of a background region of the image that is input by the inputting;
saving, in a memory, a background model in association with the image capturing parameter;
detecting a moving object region from an image input by the inputting based on the background model; and
determining, in a case where the image capturing parameter set in the setting is changed, whether to use a background model saved in the memory for detecting the moving object region in the detecting, based on an amount of change in the moving object region detected for a first image which is captured before the image capturing parameter is changed and a second image which is captured after the image capturing parameter is changed,
wherein in a case where the image capturing parameter set by the setting is changed, a background model corresponding to the changed image capturing parameter is acquired from the memory, and a moving object region is detected from the second image using the acquired background model.

\* \* \* \* \*